United States Patent
Parikh

(10) Patent No.: US 9,323,579 B2
(45) Date of Patent: Apr. 26, 2016

(54) RESOURCE ALLOCATION DIAGNOSIS ON DISTRIBUTED COMPUTER SYSTEMS

(75) Inventor: Aashish Parikh, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 483 days.

(21) Appl. No.: 13/594,812

(22) Filed: Aug. 25, 2012

(65) Prior Publication Data

US 2014/0059228 A1 Feb. 27, 2014

(51) Int. Cl.
G06F 15/173 (2006.01)
G06F 9/50 (2006.01)
H04L 12/58 (2006.01)

(52) U.S. Cl.
CPC .............. *G06F 9/505* (2013.01); *G06F 9/5005* (2013.01); *H04L 12/5865* (2013.01); *G06F 2209/508* (2013.01)

(58) Field of Classification Search
CPC .............................................. G06F 2009/4557
USPC .................................................. 709/224, 226
See application file for complete search history.

(56) References Cited

U.S. PATENT DOCUMENTS

| | | | | |
|---|---|---|---|---|
| 6,539,340 | B1 * | 3/2003 | Robins et al. .................. | 702/186 |
| 8,732,291 | B2 * | 5/2014 | Zhu et al. ....................... | 709/223 |
| 2009/0198766 | A1 * | 8/2009 | Chen et al. ..................... | 709/202 |
| 2009/0228495 | A1 * | 9/2009 | MacDonell et al. ............ | 707/10 |
| 2009/0300606 | A1 * | 12/2009 | Miller et al. ..................... | 718/1 |
| 2010/0030877 | A1 * | 2/2010 | Yanagisawa ................... | 709/221 |
| 2010/0083248 | A1 * | 4/2010 | Wood et al. ........................ | 718/1 |
| 2011/0022694 | A1 * | 1/2011 | Dalal et al. ..................... | 709/222 |
| 2011/0071779 | A1 * | 3/2011 | Kim ................................... | 702/61 |
| 2011/0131570 | A1 * | 6/2011 | Heim ................................. | 718/1 |
| 2011/0173433 | A1 * | 7/2011 | Ford et al. ..................... | 713/100 |
| 2011/0202640 | A1 * | 8/2011 | Pillutla .......................... | 709/221 |
| 2011/0231846 | A1 * | 9/2011 | Sabin et al. .................. | 718/100 |
| 2011/0239215 | A1 * | 9/2011 | Sugai ................................ | 718/1 |
| 2012/0290630 | A1 * | 11/2012 | Aizman et al. ................ | 707/827 |
| 2012/0297382 | A1 * | 11/2012 | Kim et al. .......................... | 718/1 |
| 2012/0324071 | A1 * | 12/2012 | Gulati et al. .................. | 709/223 |
| 2013/0111034 | A1 * | 5/2013 | Upadhya ....................... | 709/226 |
| 2013/0227559 | A1 * | 8/2013 | Tsirkin .............................. | 718/1 |
| 2013/0247033 | A1 * | 9/2013 | Sawhney et al. ................. | 718/1 |
| 2013/0297964 | A1 * | 11/2013 | Hegdal et al. .................... | 714/2 |
| 2013/0326051 | A1 * | 12/2013 | LeGendre et al. ............. | 709/224 |
| 2014/0019624 | A1 * | 1/2014 | Kusuta et al. ................. | 709/226 |

OTHER PUBLICATIONS

VMware Technical Journal, vol. 1, No. 1—Apr. 2012, Editors: Steve Muir, Rita Tavilla and Ben Verghese.*

* cited by examiner

*Primary Examiner* — Hamza Algibhah

(57) ABSTRACT

A system and method for performing a resource allocation diagnosis on a distributed computer system includes computing current resource allocation of the distributed computer system using a current snapshot of the distributed computer system. The current snapshot includes configurations and resource usage information of at least some components of the distributed computer system. The system and method also includes computing improved resource allocation of the distributed computer system using a modified version of the current snapshot of the distributed computer system and outputting the current resource allocation and the improved resource allocation for the resource allocation diagnosis.

21 Claims, 6 Drawing Sheets

RESOURCE ALLOCATION DIAGNOSIS ON DISTRIBUTED COMPUTER SYSTEMS

BACKGROUND

Resource allocation techniques for distributed computer systems with resource-consuming clients, such as virtual machines (VMs), are important to ensure that the clients are operating at desired or target levels. For example, if a VM dedicated to sales is running on a host computer where CPU and memory are overextended to other VMs, that VM may not be able to process orders at an acceptable level. In such a situation, additional resources of the host computer should be allocated to the sales VM or the sales VM should be moved to another host computer that has sufficient resources so that the sales VM can run efficiently at or above the acceptable level.

Conventional resource allocation techniques make changes with respect to resource allocation in a distributed computer system by examining at least the current utilizations of various resources and the current requirements of the various components of the distributed computer system. The resource allocation techniques may involve load balancing and resource scheduling. When attempting to load balance clients, e.g., VMs, running on host computers, these conventional resource allocation techniques consider various user-defined constraints, which include both implicit rules (for example, compatibility rules) and explicit rules (for example, affinity rules). Due to these various constraints, the resource allocation techniques may not be able to effectively balance the clients among the different host computers. When this occurs, the current resource allocation techniques merely inform users that the distributed computer system is imbalanced without any further information.

SUMMARY

A system and method for performing a resource allocation diagnosis on a distributed computer system includes computing current resource allocation of the distributed computer system using a current snapshot of the distributed computer system. The current snapshot includes configurations and resource usage information of at least some components of the distributed computer system. The system and method also includes computing improved resource allocation of the distributed computer system using a modified version of the current snapshot of the distributed computer system and outputting the current resource allocation and the improved resource allocation for the resource allocation diagnosis. Other embodiments are also described.

In an embodiment, a method for performing a resource allocation diagnosis on a distributed computer system includes computing current resource allocation of the distributed computer system using a current snapshot of the distributed computer system, where the current snapshot includes configurations and resource usage information of at least some components of the distributed computer system, computing improved resource allocation of the distributed computer system using a modified version of the current snapshot of the distributed computer system, and outputting the current resource allocation and the improved resource allocation for the resource allocation diagnosis.

In an embodiment, a computer-readable storage medium contains program instructions for performing a resource allocation diagnosis on a distributed computer system. Execution of the program instructions by one or more processors causes the one or more processors to perform steps including computing current resource allocation of the distributed computer system using a current snapshot of the distributed computer system, where the current snapshot includes configurations and resource usage information of at least some components of the distributed computer system, computing improved resource allocation of the distributed computer system using a modified version of the current snapshot of the distributed computer system, and outputting the current resource allocation and the improved resource allocation for the resource allocation diagnosis.

In an embodiment, a computer system for performing a resource allocation diagnosis on a distributed computer system includes a processor and a resource allocation module operably connected to the processor. The resource allocation module is configured to compute current resource allocation of the distributed computer system using a current snapshot of the distributed computer system. The current snapshot includes configurations and resource usage information of at least some components of the distributed computer system. The resource allocation module is also configured to compute improved resource allocation of the distributed computer system using a modified version of the current snapshot of the distributed computer system and output the current resource allocation and the improved resource allocation for the resource allocation diagnosis.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
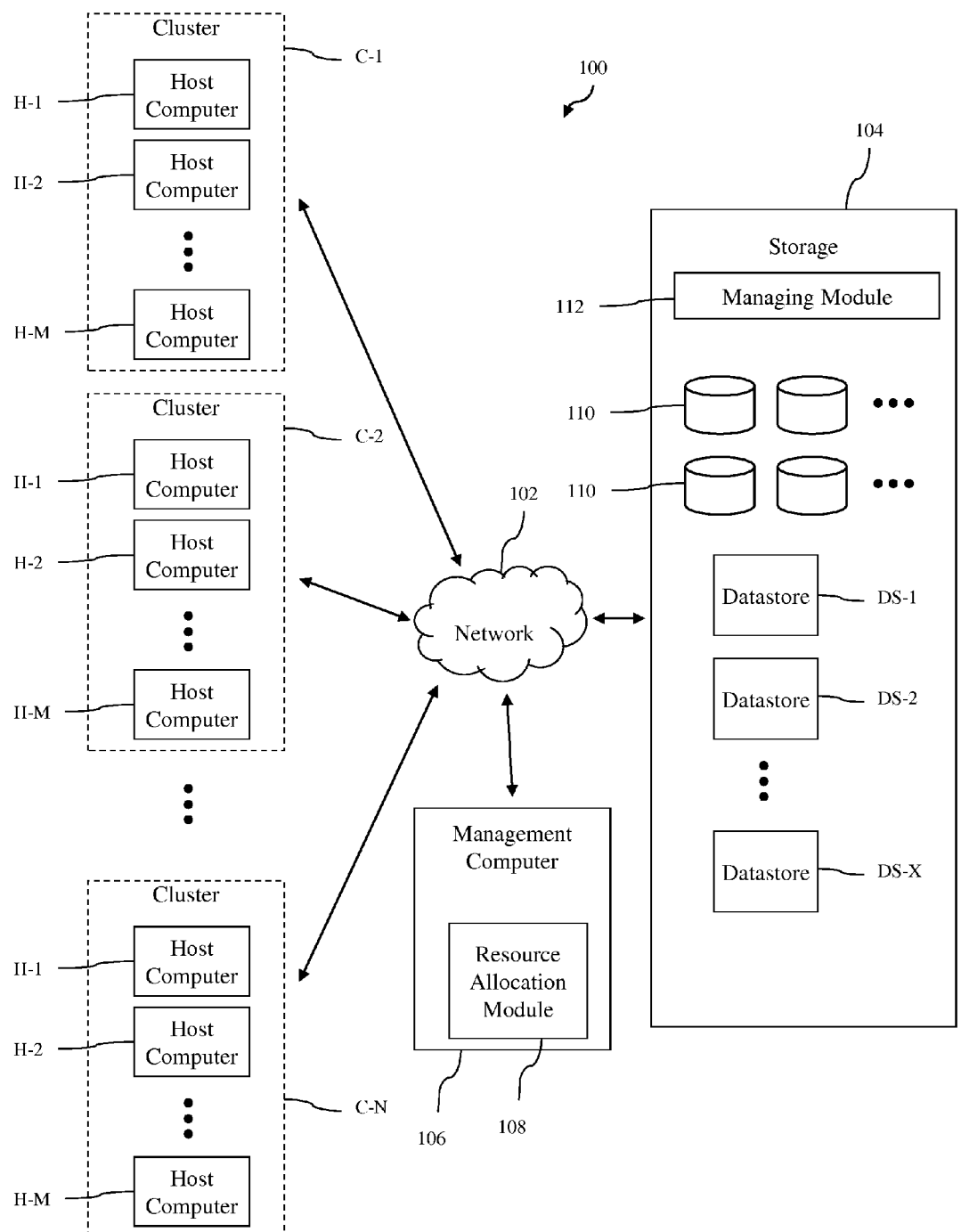
FIG. 1 is a block diagram of a distributed computer system in accordance with an embodiment of the invention.

Turning now to FIG. 1, a distributed computer system 100 in accordance with an embodiment of the invention is shown. The distributed computer system may be, for example, a computer network system. As shown in FIG. 1, the distributed computer system includes a network 102, clusters C-1, C-2 . . . C-N of host computers (where N is a positive integer), storage 104 and a management computer 106 with a resource allocation module 108. The exact number of host computer clusters included in the distributed computer system can be any number of clusters from one to tens of clusters or more. The host computers of the different clusters, the storage and the management computer are connected to the network. Thus, each of the host computers in the clusters and the management computer are able to access the storage via the network and may share the resources provided by the storage. Consequently, any process running on any of the host computers and the management computer may also access the storage via the network.

In the illustrated embodiment, each of the clusters C-1, C-2 . . . C-N includes a number of host computers H-1, H-2 . . . H-M (where M is a positive integer). The host computers can be assigned to the host computer clusters based on predefined criteria, which may include geographical and/or logical relationships between the host computers. The number of host computers included in each of the clusters can be any number from one to several hundred or more. In addition, the number of host computers included in each of the clusters can vary so that different clusters can have different number of host computers. The host computers are physical computer systems that host or support one or more clients so that the clients are executing on the physical computer systems. As used herein, the term "client" is any software entity that can run on a computer system, such as a software application, a software process or a virtual machine (VM). The host computers may be servers that are commonly found in data centers. As an example, the host computers may be servers installed in one or more server racks. Typically, the host computers of a cluster are located within the same server rack.

Figure 2:
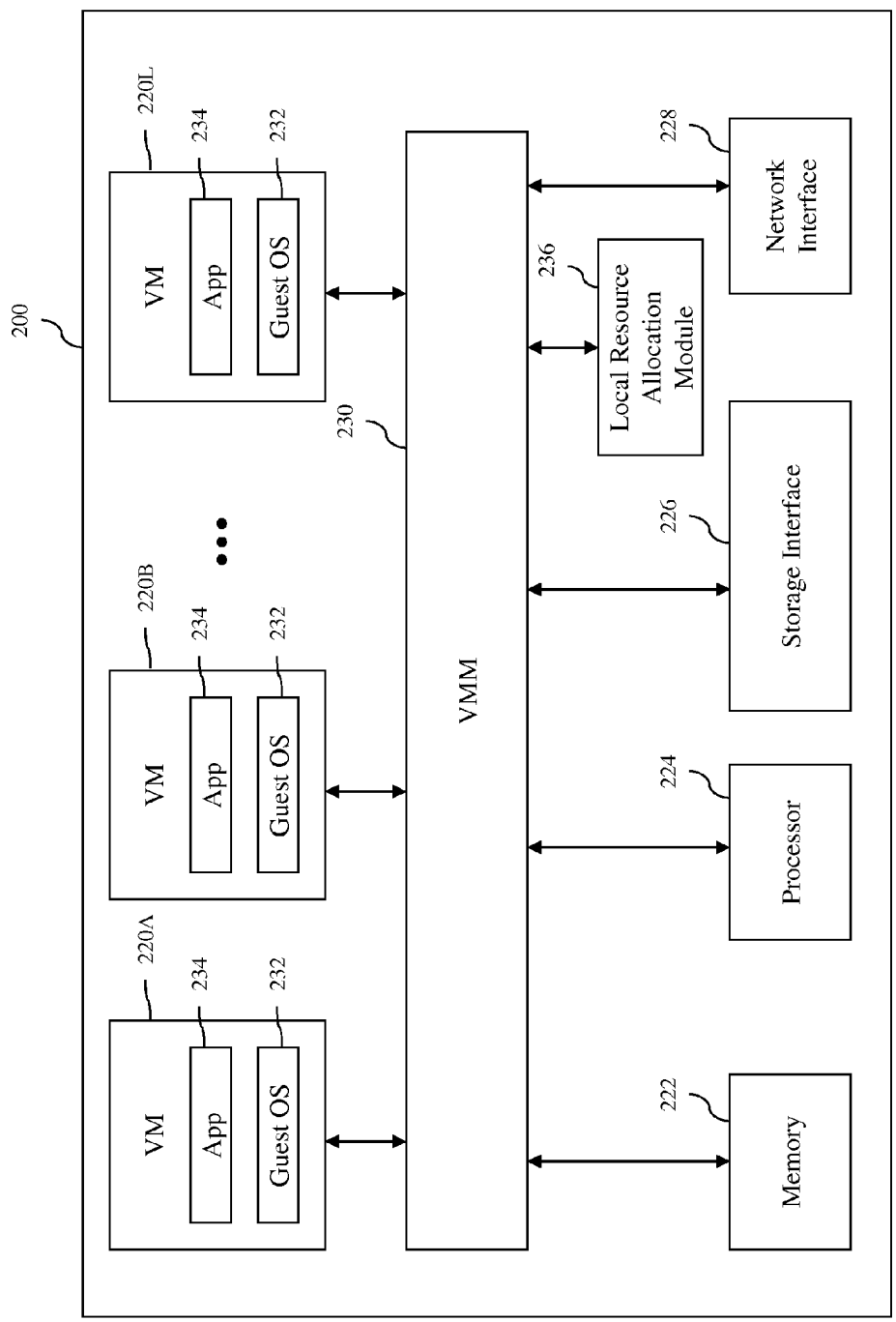
FIG. 2 is a block diagram of a host computer in accordance with an embodiment of the invention.

Turning now to FIG. 2, components of a host computer 200 that is representative of the host computers H-1, H-2 . . . H-M in the clusters C-1, C-2 . . . C-N in accordance with an embodiment of the invention are shown. In FIG. 2, the physical connections between the various components of the host computer are not illustrated. In the illustrated embodiment, the host computer is configured to support a number of clients 220A, 220B . . . 220L (where L is a positive integer), which are VMs. The number of VMs supported by the host computer can be anywhere from one to more than one hundred. The exact number of VMs supported by the host computer is only limited by the physical resources of the host computer. The VMs share at least some of the hardware resources of the host computer, which include system memory 222, one or more processors 224, a storage interface 226, and a network interface 228. The system memory, which may be random access memory (RAM), is the primary memory of the host computer. The processor can be any type of a processor, such as a central processing unit (CPU) commonly found in a server. The storage interface is an interface that allows that host computer to communicate with the storage 104. As an example, the storage interface may be a host bus adapter or a network file system interface. The network interface is an interface that allows the host computer to communicate with other devices connected to the network 102. As an example, the network interface may be a network adapter.

In the illustrated embodiment, the VMs 220A, 220B . . . 220L run on top of a virtual machine monitor (VMM) 230, which is a software interface layer that enables sharing of the hardware resources of the host computer 200 by the VMs. However, in other embodiments, one or more of the VMs can be nested, i.e., a VM running in another VM. For example, one of the VMs may be running in a VM, which is also running in another VM. The virtual machine monitor may run on top of the host computer's operating system or directly on hardware of the host computer. In some embodiments, the virtual machine monitor runs on top of a hypervisor that is installed on top of the hardware components of the host computer. With the support of the virtual machine monitor, the VMs provide virtualized computer systems that give the appearance of being distinct from the host computer and from each other. Each VM includes a guest operating system (OS) 232 and one or more guest applications (APP) 234. The guest operating system is a master control program of the respective VM and, among other things, the guest operating system forms a software platform on top of which the guest applications run.

Similar to any other computer system connected to the network 102, the VMs 220A, 220B . . . 220L are able to communicate with other computer systems connected to the network using the network interface 228 of the host computer 200. In addition, the VMs are able to access the storage 104 using the storage interface 226 of the host computer.

The host computer 200 also includes a local resource allocation module 236 that operates as part of a resource management system, such as a distributed resource scheduler system, to manage resources consumed by the VMs 220A, 220B . . . 220L. The local resource allocation module in each host computer cooperatively operates with the local resource allocation modules in the other host computers of the network computer system 100 to perform resource scheduling, which includes balancing the loads of software processes and/or storage resource scheduling, among the host computers H-1, H-2 . . . H-M of the host computer clusters C-1, C-2 . . . C-N. Although the local resource allocation module is illustrated in FIG. 2 as being separate from the virtual machine monitor 230, the local resource allocation module may be implemented as part of the virtual machine monitor. In some embodiments, the local resource allocation module is implemented as software programs running on the host computer. However, in other embodiments, the local resource allocation module may be implemented using any combination of software and hardware.

Turning back to FIG. 1, the network 102 can be any type of computer network or a combination of networks that allows communications between devices connected to the network. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel, Internet Small Computer System Interface (iSCSI), Fibre Channel over Ethernet (FCoE) and HyperSCSI.

The storage 104 is used to store data for the host computers H-1, H-2 . . . H-M of the clusters C-1, C-2 . . . C-N, which can be accessed like any other storage device connected to computer systems. In an embodiment, the storage can be accessed by entities, such as clients running on the host computers, using any file system, e.g., virtual machine file system (VMFS) or network file system (NFS). The storage includes one or more computer data storage devices 110, which can be any type of storage devices, such as solid-state devices (SSDs), hard disks or a combination of the two. The storage devices may operate as components of a network-attached storage (NAS) and/or a storage area network (SAN). The storage includes a storage managing module 112, which manages the operation of the storage. In an embodiment, the storage managing module is a computer program executing on one or more computer systems (not shown) of the storage. The storage supports multiple datastores DS-1, DS-2 . . . DS-X (where X is an integer), which may be identified using logical unit numbers (LUNs). In an embodiment, the datastores are virtualized representations of storage facilities. Thus, each datastore may use the storage resource from more than one storage device included in the storage. The datastores are used to store data associated with the clients supported by the host computers of the clusters. For virtual machines, the datastores may be used to store virtual storage, e.g., virtual disks, used by each of the virtual machines, as well as other files needed to support the virtual machines. One or more datastores may be associated with one or more host computers. Thus, each host computer is associated with at least one datastore. Some of the datastores may be grouped into one or more clusters of datastores, which are commonly referred to as storage pods.

The management server 106 operates to monitor and manage the host computers H-1, H-2 . . . H-M of the clusters C-1, C-2 . . . C-N and/or the storage 104 of the distributed computer system 100. The management server may be configured to monitor the current configurations of the host computers and the clients running on the host computers, for example, virtual machines (VMs). The monitored configurations may include hardware configuration of each of the host computers, such as CPU type and memory size, and/or software configurations of each of the host computers, such as operating system (OS) type and installed applications or software programs. The monitored configurations may also include clustering information, i.e., which host computers are included in which clusters. The monitored configurations may also include client hosting information, i.e., which clients, e.g., VMs, are hosted or running on which host computers. The monitored configurations may also include client information. The client information may include size of each of the clients, virtualized hardware configuration of each of the clients, such as virtual CPU type and virtual memory size, software configuration of each of the clients, such as OS type and installed applications or software programs running on each of the clients, and virtual storage size for each of the clients. The client information may also include resource settings, such as limit, reservation, entitlement and share values for various resources, e.g., CPU, memory, network bandwidth and storage, which are consumed by the clients.

The management server 106 may also be configured to monitor the current configuration of the storage 104, including the physical storage devices 110 and the datastores DS-1, DS-2 . . . DS-X of the storage. The monitored storage configuration may include storage device configuration, which may include the number of storage devices in the storage, the device type of the storage devices, such as solid-state devices (SSDs) and hard disks, and storage capacity of each of the storage devices. The monitored storage configuration may also include datastore configuration, such as storage capacity of each of the datastores and connections and associations between the datastores and the host computers H-1, H-2 . . . H-M and/or the clients running on the host computers.

The management server 106 may also be configured to monitor the current usage of resources by the clients, the host computers H-1, H-2 . . . H-M and the clusters C-1, C-2 . . . C-N of host computers. Thus, the management server may monitor CPU processing usage, memory usage, network usage and storage usage of the clients. The management server may also be configured to store the usage of resources by the clients, the host computers and the clusters of host computers to maintain historical resource usage information. The historical resource usage information can then be used to develop various resource usage statistics for the individual clients, the individual host computers and the individual clusters of host computers.

The management server 106 may also be configured to perform various operations to manage the clients, the host computers H-1, H-2 . . . H-M, the clusters C-1, C-2 . . . C-N of host computers and the storage 104. As an example, the management server may be configured to initially place new clients onto one or more of the host computers in particular clusters and move existing clients to different host computers and/or different clusters. The management server can assign software processes to the host computer clusters in a manner that balances the loads of the software processes running on the host computer clusters. Processes, such as VMs, can be balanced based on allocation policies, resource demand, and the availability of resources provided by the host computer clusters. Balancing can be applied to computer resources such as processor time, i.e., CPU cycles, memory space, network bandwidth (including any type of input/output or bus bandwidth), storage space, power consumption, cache space, software licenses, and so on. To effectively balance the computing resources, a running VM can be migrated from one host computer cluster to another, in a process that is known as live VM migration. As another example, the management server may be configured to power down particular clients and/or host computers to conserve power. The management server may also be configured to implement resource allocation recommendations made by the resource allocation module 108, as explained below. In order to perform these various operations, the management server may maintain requirements and preferences for the clients with respect to the host computers and the datastores. These requirements and preferences may include affinity or anti-affinity rules for some of the clients, which may be mandatory or preferential. For example, these affinity or anti-affinity rules may include rules that specify which clients should run on the same host computer or be kept on separate host computers. As another example, these affinity or anti-affinity rules may include rules that specify which host computers are acceptable to clients and which host computers are not. The management server may be configured or programmed to perform other operations to manage the distributed computer system 100. In an implementation, the management server is a VMware vCenter™ server with at least some of the features available for such server.

The resource allocation module 108 operates in at least one of two operating modes, a normal operating mode and a diagnostic operating mode. The resource allocation module may be periodically activated, i.e., called to run, at predefined intervals, for example, every five minutes. In addition, the resource allocation module may be activated at will when certain events or conditions occur. For example, the resource allocation module may be activated when one of the host computers is shut down for maintenance or a new VM is created in the distributed computer system 100. Alternatively, the resource allocation module may be activated manually by a user of the management computer 106.

In a normal operating mode, the resource allocation module 108 performs a resource allocation analysis to make resource allocation recommendations on the distributed computer system 100, including any initial client placement and client relocation recommendations, using a current snapshot of the distributed computer system. However, in a diagnostic operating mode, the resource allocation module allows a user, such as a system administrator, to obtain a diagnostic analysis of resource allocation of the clusters C-1, C-2 ... C-N of host computers H-1, H-2 ... H-M, to compute a realistic, improved (e.g., best-achievable) resource allocation metric such as a target imbalance of the computer clusters, to interpret target imbalance of the host computer clusters in the context of a realistic, improved (e.g., best-achievable) target imbalance metric, to provide a human-readable, user-friendly assessment of various faults encountered during the executions of resource allocation, and to present to a user a dashboard-like view of important metrics about various pieces of the inventory, as described in more detail below. The imbalance metric of the distributed computer system indicates the degree in which the allocation of one or more resources of the distributed computer system violates a predefined allocation policy. The imbalance metric of the distributed computer system is typically expressed in a percentage format. The lesser the imbalance metric is, the better the resources of the distributed computer system are allocated. For example, an imbalance metric of 20% indicates that the resource allocation in the distributed computer system is better than the resource allocation at an imbalance metric of 50%. The resource allocation module can also operate in the normal operating mode and the diagnostic operating mode concurrently.

As used herein a snapshot of an actual distributed computer system contains at least configuration and resource usage information of the distributed computer system at a particular moment in time. The snapshot may include the current configurations of host computers and clients running on the host computers in the distributed computer system. These configurations of the host computer and the clients may include hardware and software configurations of each host computer, clustering information, client hosting information and client information, which were described above with respect to the management computer. The snapshot may also include the current configuration of storage in the distributed computer system, including the configurations of storage devices and datastores of the storage. In addition, the snapshot may also include requirements and preferences of components in the distributed computer system. The snapshot may further include various parameters for load balancing clients in the distributed computer system. The snapshot may also include resource usage information for various components of the distributed computer system, including historical resource usage information regarding the distributed computer system. Lastly, the snapshot may also include resource allocation statistics, such as how often a client has been moved to different host computers or how often a client has consumed the entire resource allotted to that client. In an embodiment, a snapshot of a host computer cluster may include hierarchy information of the client(s) that is/are running in the cluster and/or the host computer(s) in the cluster and status information of the client(s) and/or the host computer(s). The hierarchy information may include the capacities/sizes of the clients, memory requirements of the clients, capacities of the host computers (e.g., number of processors in the host computer), or features supported in the host computers. The status information may include historical resource demand information of the clients and information of change of demand for resources of the clients.

Figure 3:
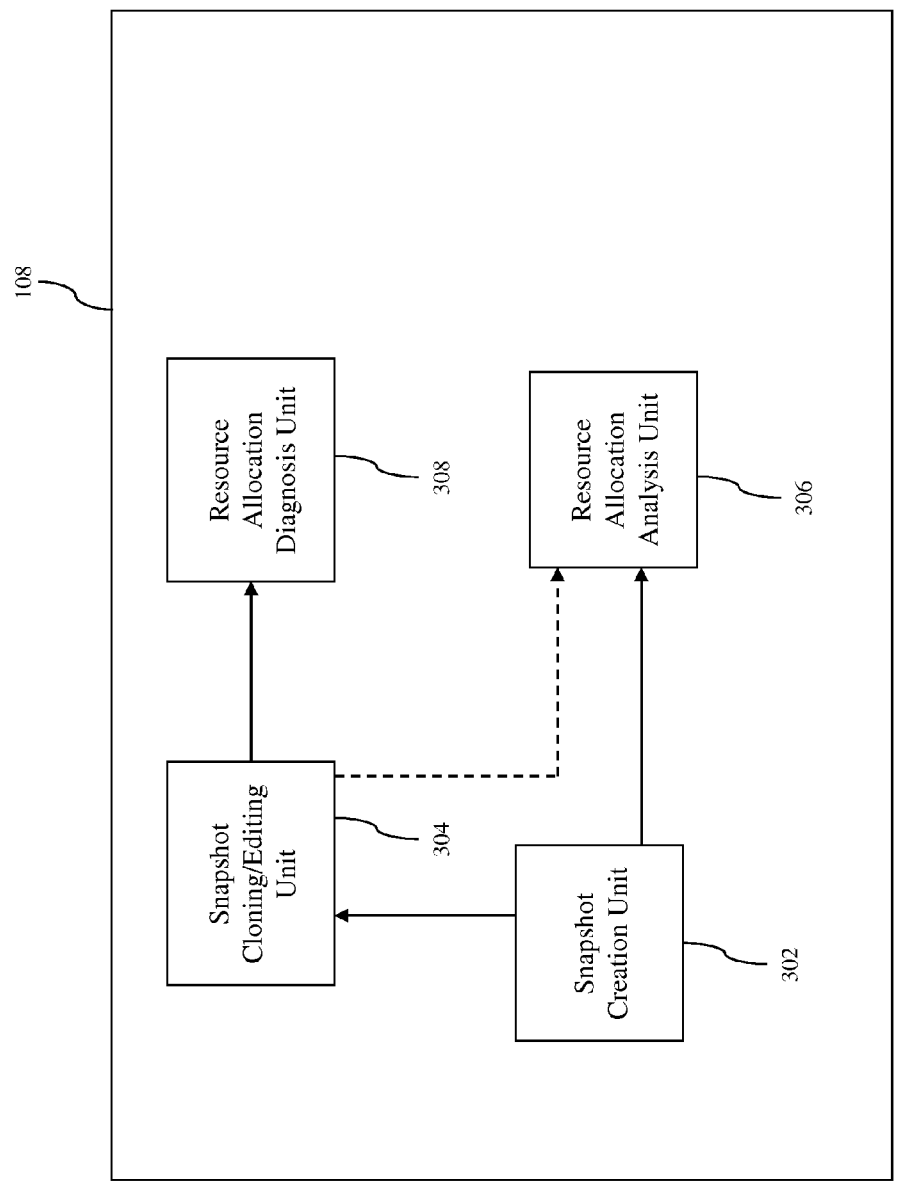
FIG. 3 is a block diagram of a resource allocation module included in a management computer of the distributed computer system in accordance with an embodiment of the invention.

Turning now to FIG. 3, a block diagram of components of the resource allocation module 108 in the management computer 106 in accordance with an embodiment of the invention is shown. As illustrated in FIG. 3, the resource allocation module 108 includes a snapshot creation unit 302, a snapshot cloning/editing unit 304, a resource allocation analysis unit 306, and a resource allocation diagnosis unit 308. These components of the resource allocation module can be implemented as software, hardware or a combination of software and hardware. In other embodiments, the resource allocation module may include other components found in conventional resource allocation modules. In a particular implementation, the resource allocation module is a distributed resource scheduler (DRS) installed in a VMware vCenter™ server that is executed by one or more processor of the server. However, in other embodiments, the resource allocation module may be installed in any other computer system.

The snapshot creation unit 302 operates to create a snapshot of the distributed computer system 100 using the information obtained by the resource allocation module 108. The snapshot creation unit interfaces with other components of the management computer 106 to obtain the information needed to generate the snapshot. In an embodiment, the snapshot is a memory object, which is produced by dumping one or more memories of the management computer. The size of the snapshot can vary, but in a particular implementation, the size of the snapshot is not larger than twenty (20) Megabytes. If the resource allocation module is operating in a normal operating mode, the generated snapshot is directly transmitted to the resource allocation analysis unit 306 for processing. If the resource allocation module is operating in a diagnostic operating mode, the generated snapshot is transmitted to the snapshot editing unit 304 so that the snapshot can be cloned/edited, for example, by a user of the management computer, e.g., a system administrator. As used herein, a clone of a snapshot is a copy of the snapshot.

The snapshot cloning/editing unit 304 can clone/change a snapshot that is created by the snapshot creation unit 302. In an embodiment, the snapshot cloning/editing unit operates to allow a user to clone the original snapshot of the distributed computer system 100 such that the resource allocation diagnosis unit 308 can process the snapshot clone, while the resource allocation analysis unit 306 processes the original snapshot. In addition, the snapshot cloning/editing unit operates to allow a user to edit a default or empty snapshot. The snapshot cloning/editing unit provides a user interface, which allows the user to edit/change, e.g., add, delete, any aspect of a snapshot or a snapshot clone. The user interface may be a graphical user interface or any user interface that allows a user to edit or modify any content of the snapshot.

The resource allocation analysis unit 306 operates to process a snapshot of the distributed computer system 100 that is generated by the snapshot creation unit 302 using at least one resource allocation analysis algorithm. Resource allocation analysis algorithms that operate on snapshots of distributed computer systems are well known, and thus, are not described herein in detail. A resource allocation analysis algorithm processes the information contained in a snapshot of a distributed computer system, such as current utilizations of resources by various components in the computer network facility, and provides one or more recommendations to optimize resource allocation in the computer network facility. In addition to the recommendations, the local resource allocation analysis unit may also present various metrics related to resource allocation, including load balancing metrics.

The resource allocation diagnosis unit 308 operates to process a snapshot of the distributed computer system 100 that is generated by the snapshot cloning/editing unit 304 using at least one resource allocation diagnosis algorithm to present various metrics related to resource allocation, including load balancing metrics, and/or generate one or more recommendations regarding resource allocations for the distributed computer system. The resource allocation diagnosis algorithm used by the resource allocation diagnosis unit performs similar operations as the resource allocation analysis algorithm used by the resource allocation analysis unit 306. For example, both the resource allocation diagnosis algorithm and the resource allocation analysis algorithm can evaluate load balancing across the host computers H-1, H-2 ... H-M of the distributed computer system 100 via process migrations, via putting host computers into stand-by mode during periods of low resource demand, and via reactivating host computers when demand increases. The resource allocation diagnosis algorithm and the resource allocation analysis algorithm can evaluate load balancing with respect to cost benefits, which includes estimating the resources required for performing a live migration of a process and estimating the performance degradation the process may experience during the migration. For example, the resource allocation diagnosis algorithm and the resource allocation analysis algorithm can estimate the performance gain for the process due to the higher availability of resources in a different host computer and due to the improved cluster balance and account demand for a long future period in order to derive the potential benefit and justify the cost of migrating the process to a different host computer or revert prior actions when loads change again in the future.

The results of the resource allocation diagnosis executed by the resource allocation diagnosis unit 308 may include the same or similar amount of information as the results of the resource allocation analysis executed by the resource allocation analysis unit 306. In an embodiment, the results of the resource allocation diagnosis and analysis may include a recommendation to maintain the current configurations and resource allocations, as defined in the received snapshot, i.e., a recommendation to make no changes to the current configurations and resource allocations. Alternatively, the results of the resource allocation diagnosis and analysis may include a recommendation to move one or more clients from their current host computers, as defined in the received snapshot, to other host computers and/or a recommendation to power down one or more clients or host computers, as defined in the received snapshot, to conserve power. The results of the resource allocation diagnosis and analysis may also include a recommendation to change the resource entitlement for one or more clients or host computers based at least on the current usage of a particular resource, as defined in the received snapshot. In an embodiment, at least one of the recommendations is used by the management server 106 to automatically execute that recommendation. Alternatively, at least one of the recommendations may be presented to a user in any format, for example, on a computer monitor, so that the user can decide to follow the recommendation, ignore the recommendation or take some other action in response to the recommendation. The results of the resource allocation diagnosis and analysis may further include metrics related to resource allocation. For example, these metrics may include (a) CPU utilization with respect to percentage overcommitted per host computer or per cluster, (b) CPU ready time per client or per host computer (aggregate), (c) memory utilization with respect to percentage overcommitted per host computer or per cluster, (d) memory access latency per client or per host computer, (e) balance metric per cluster, (f) average and peak numbers of clients per host computer, (g) power consumed per host computer or per cluster (aggregate or average), (h) storage latency per host computer or per datastore, (i) storage queue depth per host computer, (j) percentage of time storage is enabled, (k) space usage per virtual disk, per datastore or per storage pod, (l) space usage with respect to percentage thin provisioned, (m) latency per datastore or per storage pod, (n) throughput per datastore or per storage pod, (o) host-datastore connectivity percentage, (p) input/output load balancing (enabled or not), (q) average and peak numbers of virtual disks per datastore, (r) number of network ports used or free per client or per host computer, (s) chargeback with respect to current charges, and (t) imbalance metrics of each of the clusters C-1, C-2 ... C-N and/or the entire distributed computer system 100.

When the resource allocation analysis algorithm used by the resource allocation analysis unit 306 attempts to load-balance clients (e.g., VMs) running on a cluster of host computers, the resource allocation analysis algorithm has to respect various user-defined implicit and explicit constraints. For example, the resource allocation analysis algorithm must observe various user-defined compatibility rules and affinity rules. However, complying with user-defined constraints will result in the increasing of the lower bound on the best load-balance metric (e.g., load-balance metric with least standard deviation) that can be achieved in a particular cluster. Additionally, the best load-balance metric that can be achieved in a particular cluster is also determined by the granularity of the workload size. For example, balancing VMs with entitlements of "19" and "2" on hosts with capacities "20" and "20" imposes a lower bound of 12.02082 on the standard deviation achievable in the cluster. The cluster-wide imbalance metric (as measured by standard deviation) cannot be arbitrarily reduced by rearranging clients (e.g., VMs) running on host computers. Even without any affinity constraints, it is impossible to minimize the imbalance in this 2-host cluster and the imbalance metric is large, in absolute terms. Constraints such as affinity/anti-affinity rules can easily make it very difficult, sometimes impossible, to reduce the absolute number that tracks a balance metric. In addition, coarse-grained granularity of client running entitlements, in conjunction with host capacities can make this a hard problem to solve. The fall-out from complying with the user-defined implicit and explicit constraints is many-fold. For example, even being normalized by the number of host computers, the target imbalance can be misleading. In addition, the misleading target imbalance can lead to incorrectly labeling a cluster as imbalanced. Furthermore, resource balancing algorithms can kick in prematurely, causing unintended behaviors.

Compared to the resource allocation analysis algorithm used by the resource allocation analysis unit 306, the resource allocation diagnosis algorithm used by the resource allocation diagnosis unit 308 allows a user, such as a system administrator, to compute a realistic, improved (e.g., best-achievable) resource allocation (e.g., imbalance) of the distributed computer system 100 using a modified version of the current snapshot of the distributed computer system. The resource allocation analysis unit or the resource allocation diagnosis unit can compute resource allocation imbalance metric of the distributed computer system using a snapshot of the distributed computer system.

In an embodiment, the resource allocation diagnosis algorithm, when executed by the resource allocation diagnosis unit 308, runs a most aggressive variant of the resource allocation analysis algorithm used by the resource allocation analysis unit 306 on a cloned snapshot of the distributed computer system. The snapshot cloning/editing unit 304 operates to allow a user to clone a current snapshot of the entire distributed computer system or one of the host computer clusters C-1, C-2 . . . C-N of the distributed computer system that is generated by the snapshot creation unit 302. After the snapshot is cloned, the resource allocation diagnosis algorithm sets or provides an interface to allow a user to set some configuration parameters of the cloned snapshot to one or more predefined values, such as zero. For example, load balancing parameters such as "MinGoodness," "CostBenefit," and "FixSevereImbalanceOnly" in the cloned snapshot can be set to zero. When the parameter "MinGoodness" is set to zero, all of client (e.g., VM) migration and storage migration candidates are considered, regardless of the load balancing contributions of the client migrations. When the parameter "CostBenefit" is set to zero, all of client migration and storage migration candidates are considered, regardless of long term effects of the migrations. When the parameter "FixSevereImbalanceOnly" is set to zero, all of client migration and storage migration candidates are considered, regardless of whether a particular migration only fixes severe imbalance. The resource allocation diagnosis algorithm performs resource balancing (e.g., load balancing) using the modified snapshot to measure a "best" or "ideal" imbalance metric.

In another embodiment, the resource allocation diagnosis algorithm used by the resource allocation diagnosis unit 308 runs a new pass of an initial-placement operation on the set of clients (e.g., VMs) and the host computers in the current inventory of the distributed computer system 100. In this embodiment, the snapshot cloning/editing unit 304 is used to populate a default or empty snapshot with host objects identical to host objects in a current snapshot of the distributed computer system. The snapshot cloning/editing unit is then used to creates new client objects based on the client objects in the current snapshot of the distributed computer system such that the capacities of these new client objects are the same as the capacities of the corresponding client objects in the current snapshot of the distributed computer system. Each new client object also inherits constraints of the corresponding client object in the current snapshot. These new client objects are added to the populated snapshot via an initial-placement call on the populated snapshot to arrive at a best-case scenario for balanced placement in the distributed computer system or a particular host computer cluster, while respecting user constraints. The initial-placement call is executed by the resource allocation diagnosis algorithm. The resource allocation diagnosis algorithm then measures the imbalance metric and use the imbalance metric of the resulting inventory as a "best" or "ideal" imbalance metric.

The resource allocation diagnosis algorithm used by the resource allocation diagnosis unit 308 can distinguish between the case where the resource balancing has failed to perform correctly and the case where the resource balancing was given an impossible target to achieve. In particular, the resource allocation diagnosis algorithm interprets target imbalance of the distributed computer system 100 in the context of a realistic, improved (e.g., best-achievable) target imbalance metric. In an embodiment, the resource allocation diagnosis algorithm compares the current imbalance of the distributed computer system or a particular host computer cluster C-1, C-2 . . . or C-N against the target imbalance metric as provided by a user and the computed realistic, best-achievable metric and presents the comparison result to the user, for example, in a user interface displayed on a computer monitor. Instead of presenting a conclusive message such as "the cluster is imbalanced," the resource allocation diagnosis unit 308 can present a user with a much more useful message, such as "the cluster is severely imbalanced but the target imbalance is unachievable with the current set of constraints in the system."

During a resource balancing (e.g., load-balancing) pass of the resource allocation diagnosis algorithm, different combinations of client migrations between host computers and storage migrations are considered and rejected for a variety of reasons, including but not limited to rule violations (affinity and anti-affinity rules), compatibility faults (heterogeneous processor architectures, etc.), resource allocation (including storage resource allocation) being disabled on specific virtual machine disk (VMDKs), lack of connectivity between hosts and datastores, and as a result of the value of MinGoodnessFiltering, which leads to a message such as "the proposed move is good but not good enough." The resource allocation analysis algorithm used by the resource allocation analysis unit 306 usually does not track these faults or report to users in any meaningful way, which leaves users unaware of the reasons why their clusters may still remain imbalanced. Compared to the resource allocation analysis algorithm used by the resource allocation analysis unit, the resource allocation diagnosis algorithm used by the resource allocation diagnosis unit 308 can provide a human-readable, user-friendly assessment of various faults encountered during the executions of resource balancing algorithms. The resource allocation diagnosis algorithm can present discovered faults to users in a meaningful way. In an embodiment, the resource allocation diagnosis algorithm presents the users with a simple count of the number of times a certain fault is encountered to help the users to diagnose and debug a misconfiguration in her/his cluster, which can lead to better resource balancing. In another embodiment, the resource allocation diagnosis algorithm presents a user with a list of entities that throw faults in a user interface. For example, the resource allocation diagnosis algorithm presents a user with a list of VMs with the resource allocation feature disabled on them, a list of affinity rules in a particular cluster, etc. When used in conjunction with the computation of a realistic, best-achievable target imbalance metric, a user is presented not just with the best number she/he can expect to reach but also with a list of reasons for why she/he can do no better with the current constraints in the system.

Figure 4:
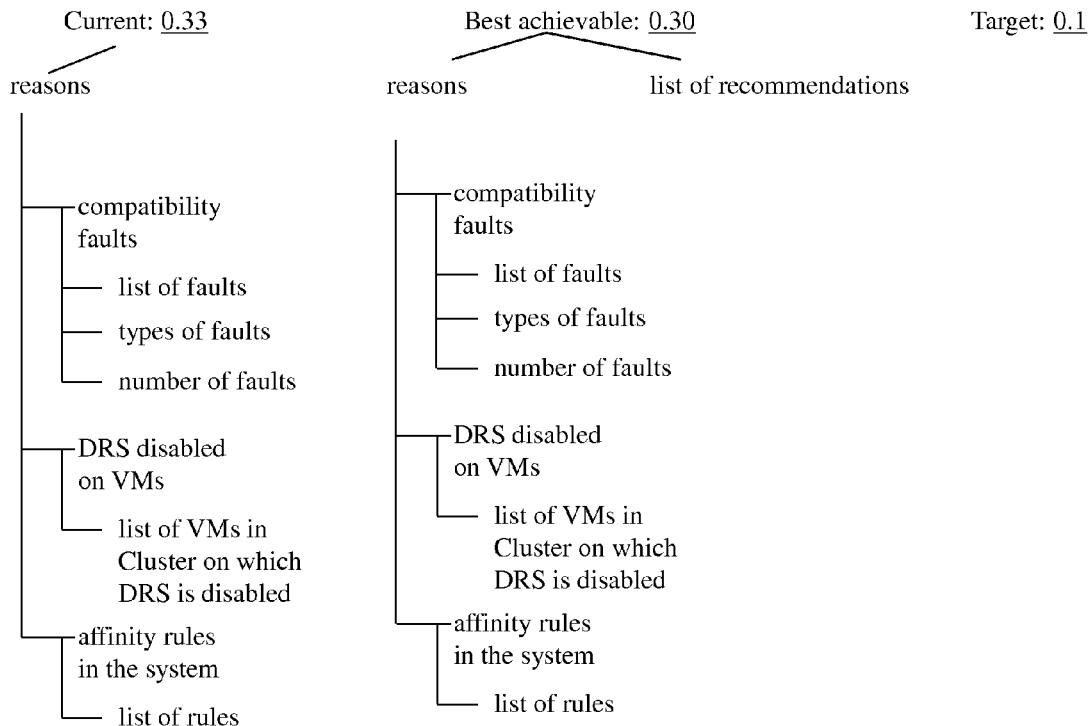
FIG. 4 is a panel for tracking resource allocation metrics in accordance with an embodiment of the invention.

The resource allocation diagnosis algorithm used by the resource allocation diagnosis unit 308 may also present various metrics related to resource allocation. For example, these metrics may include (a) CPU utilization with respect to percentage overcommitted per host computer or per cluster, (b) CPU ready time per client or per host computer (aggregate), (c) memory utilization with respect to percentage overcommitted per host computer or per cluster, (d) memory access latency per client or per host computer, (e) balance metric per cluster, (f) average and peak numbers of clients per host computer, (g) power consumed per host computer or per cluster (aggregate or average), (h) storage latency per host computer or per datastore, (i) storage queue depth per host computer, (j) percentage of time storage is enabled, (k) space usage per virtual disk, per datastore or per storage pod, (l) space usage with respect to percentage thin provisioned, (m) latency per datastore or per storage pod, (n) throughput per datastore or per storage pod, (o) host-datastore connectivity percentage, (p) input/output load balancing (enabled or not), (q) average and peak numbers of virtual disks per datastore, (r) number of network ports used or free per client or per host computer, (s) chargeback with respect to current charges, and (t) imbalance metrics of each of the clusters C-1, C-2 ... C-N and/or the entire distributed computer system 100. In an embodiment, the allocation diagnosis unit 308 can present a dashboard-like view of important metrics about various pieces of the distributed computer system inventory in a user interface. These metrics may include metrics related to host computers and datastore, which are presented in a unified, dashboard-like panel to track these metrics. For some of these metrics such as the computed realistic, best-achievable target imbalance metric, the "reasons" for that number may are also provided in the panel. An example of the dashboard-like panel is shown in FIG. 4.

In some embodiments, the resource allocation module 108 can operate in a hypothetical operating mode, to allow a user, such as a system administrator, to create a user-modified snapshot of a hypothetical distributed computer system so that a resource allocation analysis can be made on the user-modified snapshot. In these embodiments, the snapshot cloning/editing unit 304 may operate to produce a user-modified snapshot that can be viewed as a snapshot of an imaginary or hypothetical distributed computer system, which is similar to the distributed computer system 100 but has been virtually changed with respect to some aspect of the distributed computer system by the user. The resource allocation analysis unit 306 may operate to perform a resource allocation analysis on the user-modified snapshot during the hypothetical operating mode. For the hypothetical operating mode, the metrics generated by the resource allocation analysis unit can be used by the user to see how the hypothetical distributed computer system, which was virtually created using the user-modified snapshot, would fare with respect to resource allocation. This allows the user to make up different "what if" scenarios for the distributed computer system to see what effect the different scenarios would have on the resource allocation analysis results. Thus, the hypothetical operating mode of the resource allocation module allows the user to essentially run resource allocation analyses on different distributed computer systems without having to actually configure the distributed computer system into such different distributed computer systems. In other words, the hypothetical operating mode of the resource allocation module allows the user to run resource allocation analyses on imaginary distributed computer systems to get results without having to create or configure such distributed computer systems in the real world and run the resource allocation analyses on the real distributed computer systems.

In an embodiment, the snapshot cloning/editing unit 304 may operate using queries to produce user-modified snapshots of a hypothetical distributed computer system. In this embodiment, a user would enter a query about a specific modification to the current distributed computer system 100 using a user interface provided by the snapshot cloning/editing unit. In response to the query, the snapshot cloning/editing unit would modify the snapshot of the distributed computer system accordingly, and then transmit the user-modified snapshot to the resource allocation analysis unit 306 for processing. As an example, the query entered by the user may be "If I upgrade the inventory to add two hosts of type 1, remove one host of type 2 and add 10 new VMs, what will the new cost be?" For this query, the snapshot cloning/editing unit would modify the snapshot of the current distributed computer system to reflect these changes, and then transmit the user-modified snapshot to the resource allocation analysis unit, which would process the user-modified snapshot and produce the answer in terms of one or more relevant metrics, e.g., metric for current charges. The following is a list of additional query examples. This is not an exhaustive list.

(1) "If I upgrade these hosts in my clusters, what will my new inventory look like? What will the new balance number be? What will my new TOPS be with respect to storage?"
(2) "If I remove this affinity rule, what will be the new health of my clients/hosts/cluster?"
(3) Which are the 4 least loaded hosts that I can put into maintenance mode to upgrade them to the new build?"
(4) "Why can you not reach my target balance?"
(5) "If I make these changes to my inventory, what will the new ready time numbers look like? What will balance number look like?"
(6) "If I added a clone of host4 to, remove host3 from and added 10 clones on vm24 to my cluster, what will the new inventory look like? How many migrations will be scheduled?"
(7) "If I break this VM-VM affinity rule, what will my new average VMs-per-host number be?"
(8) "If I enable power management mode on this host, these hosts or on all hosts in the cluster, what will my new power consumption numbers be?"
(9) "If I enable power management mode in the cluster and provide a cost/watt number, what will my electricity bill be reduced by?"
(10) "If I connect these hosts to this datastore, what will my new connectivity percentage be? Will input/output load balancing become enable in my storage pod?"
(11) "If I had two clones of datastore1 in my storage pod, what will the new inventory look like? How many migrations will be scheduled?"
(12) "If I enable Host Based Replication (HBR) on these hosts in my cluster, what will be the result of the resource allocation analysis?"
(13) "If I enabled (or disabled) Site Recovery Manager (SRM) on these datastores in my storage pod, what will be the result of the resource allocation analysis?"
(14) "If I enable Enhanced VMotion Compatibility (EVC), what will be the result of the resource allocation analysis with respect to load balancing?"

In other embodiments, a user-modified snapshot from the snapshot cloning/editing unit 304 may also be processed by the resource allocation diagnosis unit 308 to measure the "best" or "ideal" imbalance metric for the hypothetical distributed computer system in the same manner as described above for the actual distributed computer system. Thus, in these embodiments, a dashboard-like panel with various metrics and imbalance reasons may be provided for the hypothetical distributed computer system.

Although some of the embodiments described above are related to resource allocation imbalance, the resource allocation diagnosis/analysis techniques described in these embodiments are also applicable to other resource allocation metrics.

Figure 5:
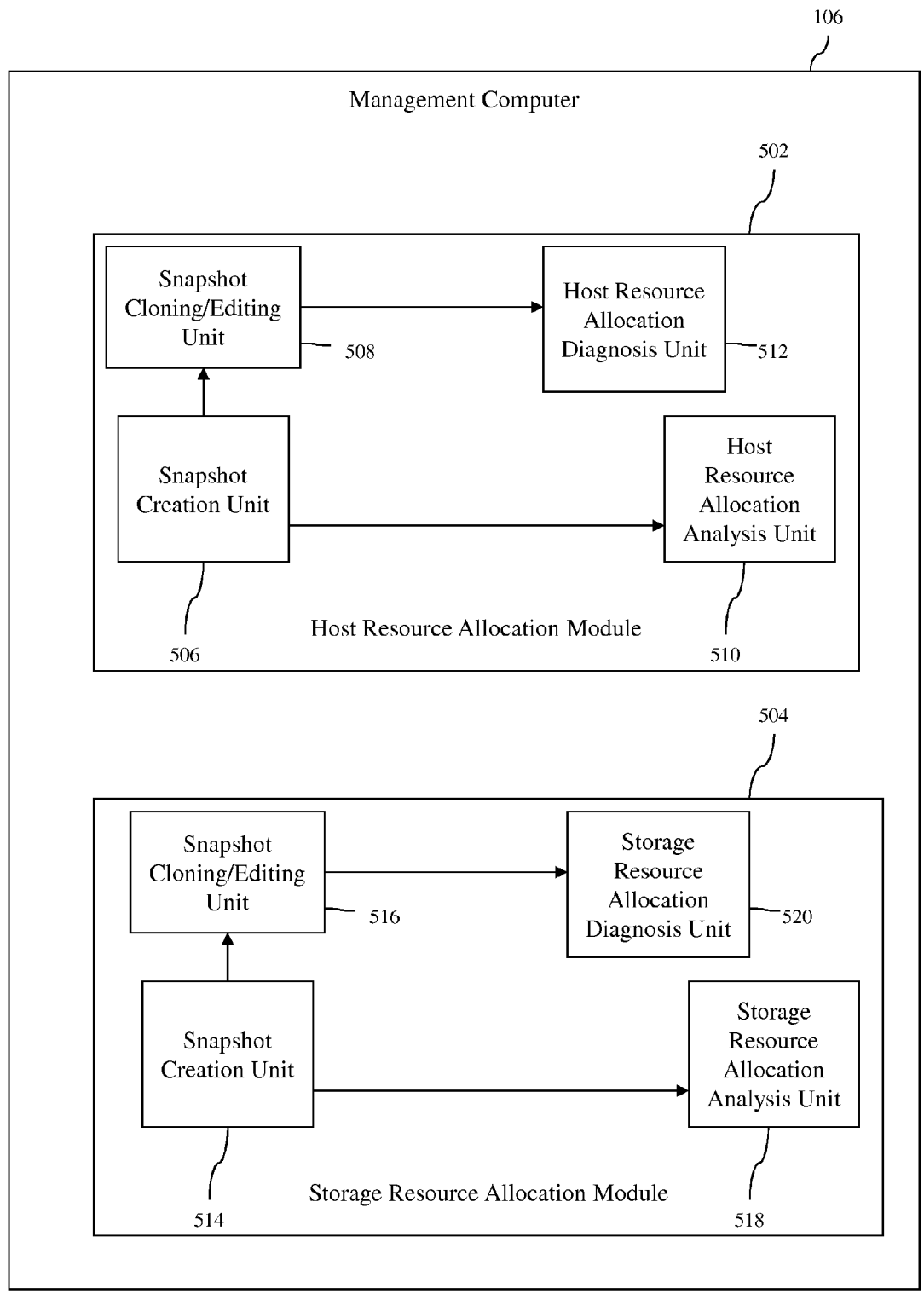
FIG. 5 is a block diagram of the management computer of the distributed computer system in accordance with another embodiment of the invention.

Turning now to FIG. 5, the management server 106 in accordance with another embodiment of the invention is shown. In this embodiment, the management server includes a host resource allocation module 502 and a storage resource allocation module 504. The host resource allocation module handles allocation of resources provided by the host computers H-1, H-2 . . . H-M in the clusters C-1, C-2 . . . C-N. In an implementation, the host resource allocation module is part of a distributed resource scheduler (DRS) provided by VMware, Inc., and thus, may include some of the features and functionalities of such DRS. The storage resource allocation module handles allocation of storage resources provided by the storage 104. In an implementation, the storage resource allocation module is part of a storage distributed resource scheduler (SDRS) provided by VMware, Inc., and thus, may include some of the features and functionalities of such SDRS.

The host resource allocation module 502 is similar to the resource allocation module 108 shown in FIG. 3. However, the host resource allocation module performs allocation analysis with respect to resources only provided by the host computers H-1, H-2 . . . H-M. Thus, the host resource allocation module does not hand allocation of storage resources provided by the storage 104. Similar to the resource allocation module 108, the host resource allocation module includes a snapshot creation unit 506, a snapshot cloning/editing unit 508, a host resource allocation analysis unit 510, and a host resource allocation diagnosis unit 512. These units of the host resource allocation module operate in a similar manner as the units of the resource allocation module. The snapshot creating unit 506 is configured to create a snapshot of the distributed computer system 100. In particular, the snapshot created by the snapshot creating unit includes information regarding the host computers in the distributed computer system and the clients running on the host computers. However, the snapshot created by the snapshot creating unit may not include information regarding the storage. The snapshot cloning/editing unit 508 is configured to clone or change a snapshot created by the snapshot creating unit 506, or create and edit a new snapshot. The host resource allocation analysis unit 510 is configured to perform a resource allocation analysis on the original snapshot of the distributed computer system. The host resource allocation diagnosis unit 512 is configured to perform a resource allocation diagnosis on the snapshot that is generated by the snapshot cloning/editing unit 508. The results of the resource allocation analysis and the resource allocation diagnosis, which can include one or more recommendations and various metrics of the distributed computer system represented by the processed snapshot, can then be presented to the user.

The storage resource allocation module 504 is also similar to the resource allocation module 108 shown in FIG. 3. However, the storage resource allocation module performs allocation analysis with respect to resources only provided by the storage 104. Thus, the storage resource allocation module does not hand allocation of resources provided by the host computers H-1, H-2 . . . H-M, such as CPU and memory resources. Similar to the resource allocation module 108, the storage resource allocation module includes a snapshot creation unit 514, a snapshot cloning/editing unit 516, a storage resource allocation analysis unit 518, and a storage resource allocation diagnosis unit 520. These units of the storage resource allocation module operate in a similar manner as the units of the resource allocation module. The snapshot creating unit 514 is configured to create a snapshot of the distributed computer system 100. In particular, the snapshot created by the snapshot creating unit includes information regarding the storage devices 110 and/or datastores DS-1, DS-2 . . . DS-X of the storage. However, the snapshot created by the snapshot creating unit may not include information regarding the resources provided by the host computers. The snapshot cloning/editing unit 516 is configured to clone or change a snapshot created by the snapshot creating unit 506, or create and edit a new snapshot. The storage resource allocation analysis unit 518 is configured to perform a resource allocation analysis on the original snapshot. The storage resource allocation diagnosis unit 520 is configured to perform a resource allocation diagnosis on the snapshot that is generated by the snapshot cloning/editing unit 516. The results of the resource allocation analysis and the resource allocation diagnosis, which can include one or more recommendations and various metrics of the distributed computer system represented by the processed snapshot, can then be presented to the user.

Figure 6:
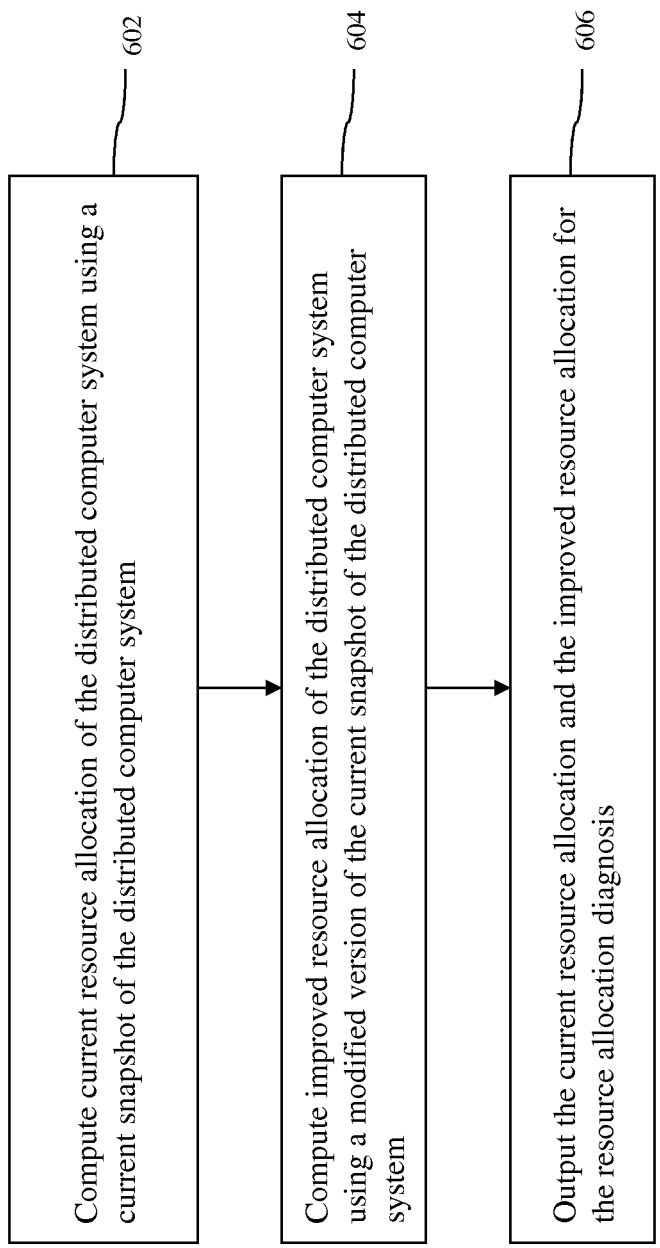
FIG. 6 is a flow diagram of a method for performing a resource allocation diagnosis on a distributed computer system in accordance with an embodiment of the invention.

A method for performing a resource allocation diagnosis on a distributed computer system in accordance with an embodiment of the invention is described with reference to a flow diagram of FIG. 6. At block 602, current resource allocation of the distributed computer system is computed using a current snapshot of the distributed computer system, where the current snapshot includes configurations and resource usage information of at least some components of the distributed computer system. At block 604, improved resource allocation of the distributed computer system is computed using a modified version of the current snapshot of the distributed computer system. At block 606, the current resource allocation and the improved resource allocation are output for the resource allocation diagnosis. In an embodiment, a list of modifications that would have to be performed to achieve the improved (e.g., best achievable) resource allocation is also output for the resource allocation diagnosis.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for performing a resource allocation diagnosis on a distributed computer system, the method comprising:
    computing current resource allocation of the distributed computer system using a current snapshot of the distributed computer system, wherein the current snapshot includes configurations and resource usage information of at least some components of the distributed computer system, including configurations of host computers in the distributed computer system and clients running on at least some of the host computers;
    computing improved resource allocation of the distributed computer system using a modified version of the current snapshot of the distributed computer system; and
    outputting the current resource allocation and the improved resource allocation for the resource allocation diagnosis,
    wherein the computing of the improved resource allocation comprises:
        creating a new snapshot of the distributed computer system and populating the new snapshot with host computers identical to host computers in the current snapshot of the distributed computer system;
        creating new clients based on clients in the current snapshot and adding the new clients to the new snapshot via an initial-placement call, wherein capacities of the new clients are the same as capacities of corresponding clients in the current snapshot, and wherein the new clients inherit constraints from the corresponding clients in the current snapshot; and
        after the new clients are added to the new snapshot, calculating the improved resource allocation using the new snapshot.

2. The method of claim 1, wherein the clients running on the at least some of the host computers include virtual machines.

3. The method of claim 1, wherein the current snapshot of the distributed computer system includes configurations of storage devices in the distributed computer system.

4. The method of claim 1, wherein the current snapshot of the distributed computer system includes resource requirements of the clients running on the host computers in the distributed computer system.

5. The method of claim 1, wherein the outputting the current resource allocation and the improved resource allocation includes:
    comparing the current resource allocation of the distributed computer system against target resource allocation and the improved resource allocation; and
    presenting a result of the comparison.

6. The method of claim 5, further comprising presenting an assessment of faults encountered during the execution of the resource allocation diagnosis.

7. The method of claim 6, further comprising presenting reasons for achieving the improved resource allocation.

8. A non-transitory computer-readable storage medium containing program instructions for performing a resource allocation diagnosis on a distributed computer system, wherein execution of the program instructions by one or more processors causes the one or more processors to perform steps comprising:
    computing current resource allocation of the distributed computer system using a current snapshot of the distributed computer system, wherein the current snapshot includes configurations and resource usage information of at least some components of the distributed computer system, including configurations of host computers in the distributed computer system and clients running on at least some of the host computers;
    computing improved resource allocation of the distributed computer system using a modified version of the current snapshot of the distributed computer system; and
    outputting the current resource allocation and the improved resource allocation for the resource allocation diagnosis,
    wherein the computing of the improved resource allocation comprises:
        creating a new snapshot of the distributed computer system and populating the new snapshot with host computers identical to host computers in the current snapshot of the distributed computer system;
        creating new clients based on clients in the current snapshot and adding the new clients to the new snapshot via an initial-placement call, wherein capacities of the new clients are the same as capacities of corresponding clients in the current snapshot, and wherein the new clients inherit constraints from the corresponding clients in the current snapshot; and
        after the new clients are added to the new snapshot, calculating the improved resource allocation using the new snapshot.

9. The non-transitory computer-readable storage medium of claim 8, wherein the clients running on the at least some of the host computers include virtual machines.

10. The non-transitory computer-readable storage medium of claim 8, wherein the current snapshot of the distributed computer system includes configurations of storage devices in the distributed computer system.

11. The non-transitory computer-readable storage medium of claim 8, wherein the current snapshot of the distributed computer system includes resource requirements of the clients running on the host computers in the distributed computer system.

12. The non-transitory computer-readable storage medium of claim 8, wherein the outputting the current resource allocation and the improved resource allocation includes:
    comparing the current resource allocation of the distributed computer system against target resource allocation and the improved resource allocation; and
    presenting a result of the comparison.

13. The non-transitory computer-readable storage medium of claim 12, further comprising presenting an assessment of faults encountered during the execution of the resource allocation diagnosis.

14. The non-transitory computer-readable storage medium of claim 13, further comprising presenting reasons for achieving the improved resource allocation.

15. A computer system for performing a resource allocation diagnosis on a distributed computer system comprising:
a processor; and
a resource allocation module operably connected to the processor, wherein the resource allocation module is configured to:
compute current resource allocation of the distributed computer system using a current snapshot of the distributed computer system, wherein the current snapshot includes configurations and resource usage information of at least some components of the distributed computer system, including configurations of host computers in the distributed computer system and clients running on at least some of the host computers;
compute improved resource allocation of the distributed computer system using a modified version of the current snapshot of the distributed computer system; and
output the current resource allocation and the improved resource allocation for the resource allocation diagnosis,
wherein the resource allocation module is further configured to:
create a new snapshot of the distributed computer system and populate the new snapshot with host computers identical to host computers in the current snapshot of the distributed computer system;
create new clients based on clients in the current snapshot and add the new clients to the new snapshot via an initial-placement call, wherein capacities of the new clients are the same as capacities of corresponding clients in the current snapshot, and wherein the new clients inherit constraints from the corresponding clients in the current snapshot; and
after the new clients are added to the new snapshot, calculate the improved resource allocation using the new snapshot.

16. The computer system of claim 15, wherein the clients running on the at least some of the host computers include virtual machines.

17. The computer system of claim 15, wherein the current snapshot of the distributed computer system includes configurations of storage devices in the distributed computer system.

18. The computer system of claim 15, wherein the current snapshot of the distributed computer system includes resource requirements of the clients running on the host computers in the distributed computer system.

19. The computer system of claim 15, wherein the resource allocation module is further configured to:
compare the current resource allocation of the distributed computer system against target resource allocation and the improved resource allocation; and
present a result of the comparison.

20. The computer system of claim 19, wherein the resource allocation module is further configured to present an assessment of faults encountered during the execution of the resource allocation diagnosis.

21. The computer system of claim 20, wherein the resource allocation module is further configured to present reasons for achieving the improved resource allocation.

* * * * *